June 24, 1941.  A. P. ADNEY  2,246,774
HIGH SPEED CLUTCH
Filed Dec. 12, 1940   2 Sheets-Sheet 1
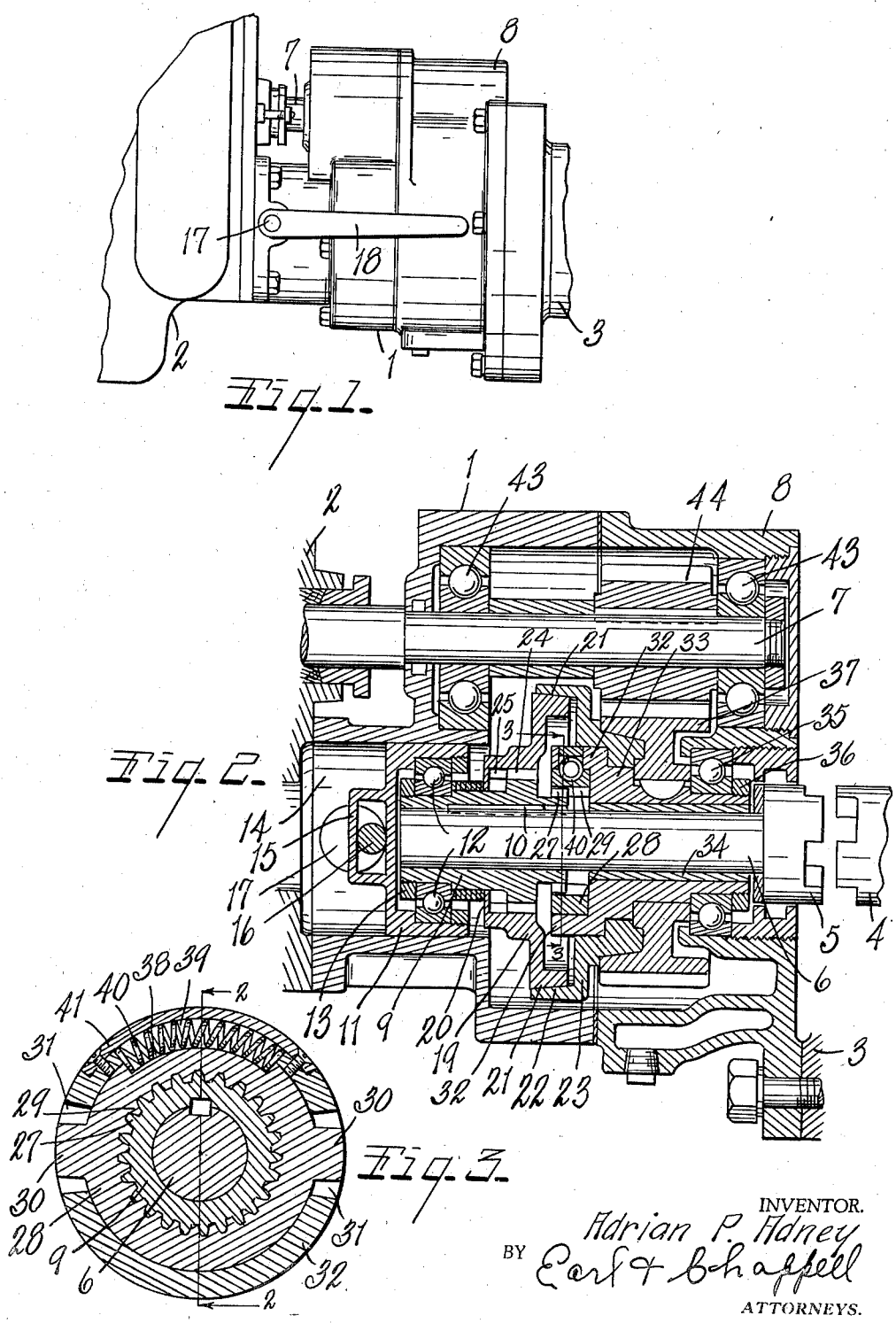
INVENTOR.
Adrian P. Adney
BY Earl & Chappell
ATTORNEYS.

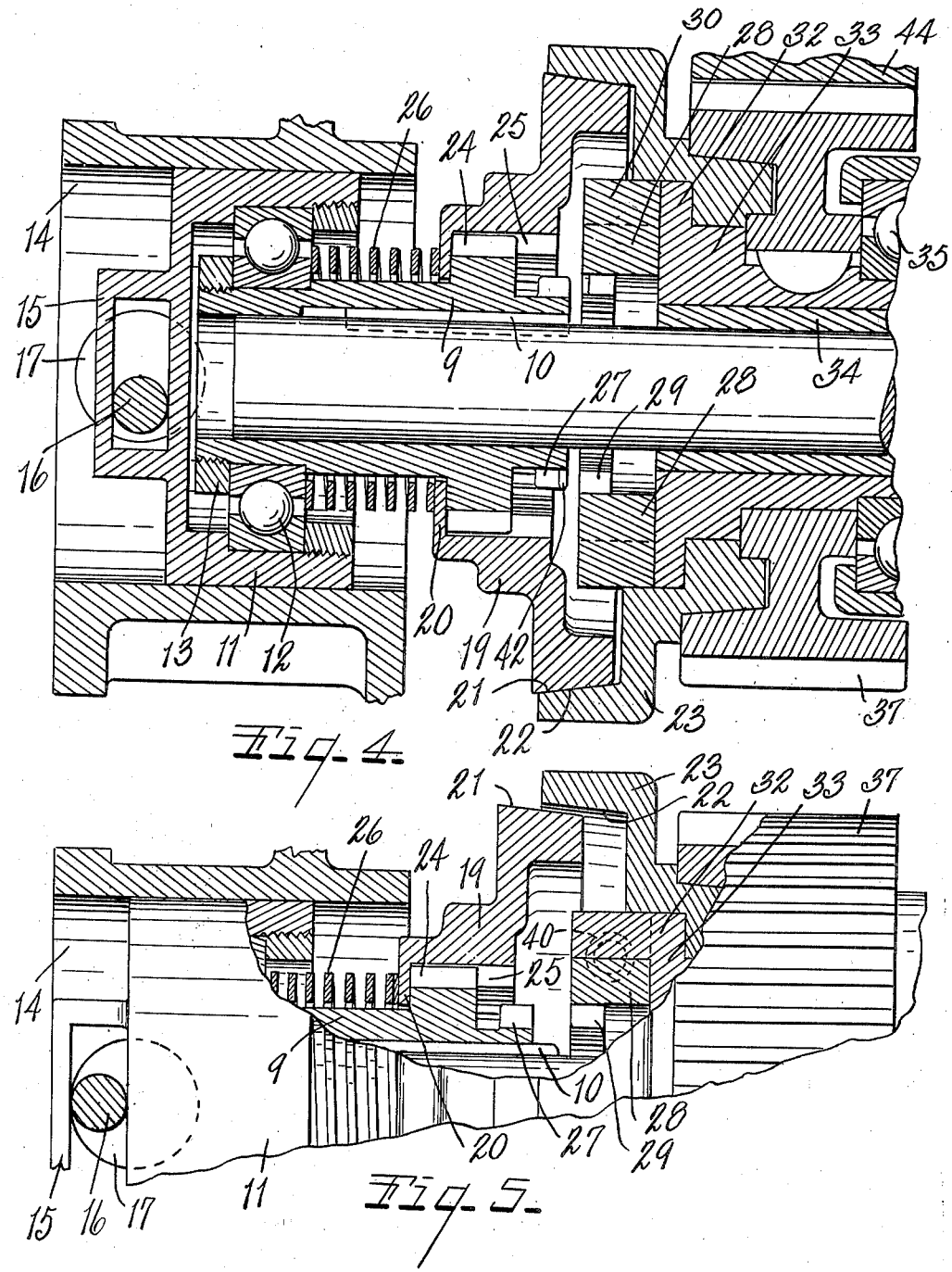

Patented June 24, 1941

2,246,774

UNITED STATES PATENT OFFICE 2,246,774

HIGH SPEED CLUTCH

Adrian P. Adney, Battle Creek, Mich., assignor to American-Marsh Pumps, Inc., Battle Creek, Mich.

Application December 12, 1940, Serial No. 369,702

11 Claims. (Cl. 192—53)

The main objects of this invention are:

First, to provide an improved clutch or driving connection particularly designed for the clutching of a driven instrumentality to a driving instrumentality at high speed operation of the latter.

Second, to provide a combined friction-positive jaw clutch of the type described adapted to synchronize the operating speed of a driven and driving instrumentality prior to effecting a positive drive connection therebetween and having means for insuring accurate and unfailing alinement of jaw clutch drive devices operatively connected respectively with the driving and driven instrumentality.

Third, to provide a combined friction and positive acting clutch of the character described having automatic self-aligning provisions enabling the clutch to be actuated by a single swift control manipulation without damage thereto.

Fourth, to provide a clutch of the type described which is simple, compact and relatively inexpensive in its parts and extremely sturdy so as to withstand rough usage.

Further objects relating to details and economies of my invention will appear from the description to follow. The invention is defined in the claims.

The present invention relates in general to a clutch connection for high speed pumps of the type illustrated and described in the patent to Yates 1,712,190 of May 20, 1929, namely, of a type incorporating both friction and positive jaw clutch provisions for first synchronizing the speed of operation of driving and driven instrumentalities and then effecting a positive driving connection therebetween. Such clutch mechanisms are of considerable importance in the operation of high speed fire pumps and the Yates patent referred to is illustrative of such an adaptation, however it should be clearly understood that the present clutch also has application to other fields wherein it is desired to provide a manually actuable clutch connection between high speed driving and driven instrumentalities which is capable of being operated swiftly and without the exercise of excessive care, yet insuring an effective driving connection without damage to any of the parts of the clutch or other instrumentalities associated therewith.

In particular, the present invention relates to the improvement of a clutch of the type described by the incorporation of a self-alining device therein whereby the positive driving jaw elements are unfailingly brought into driving relation without decreasing the speed with which the driving connection may be made.

A structure embodying the features of my invention is illustrated in the accompanying drawings, wherein:

Fig. 1 is a fragmentary view in side elevation illustrating a clutch mechanism in accordance with my invention operatively associated with a driven instrumentality, for example, a rotary centrifugal pump.

Fig. 2 is a fragmentary view in vertical longitudinal section on a line corresponding to line 2—2 of Fig. 3, illustrating details of construction and arrangement of the parts of my clutch and the operative engaged or driving relation thereof to driving and driven instrumentalities with which it is associated.

Fig. 3 is a view in section on a line corresponding to line 3—3 of Fig. 2, illustrating details of construction of the alining device incorporated in the present clutch, the parts being shown in engaged position of the clutch.

Fig. 4 is an enlarged fragmentary view in vertical central longitudinal section generally similar to Fig. 2, illustrating the parts of the clutch in an intermediate partially engaged or synchronizing position.

Fig. 5 is an enlarged fragmentary view in side elevation partially broken away and in section corresponding to Fig. 4, illustrating the parts in disengaged or inoperative position.

Referring to the drawings, the reference numeral 1 in general indicates the clutch of my invention which is shown as operatively connected to a driven instrumentality such as a rotary centrifugal pump 2 and also to a suitable driving instrumentality 3 which may be any intermediate control or power transmission mechanism to which the clutch is bolted and which enables the same to be driven from the drive or crank shaft of an internal combustion engine or other prime mover. A manually disengageable driving connection comprising a clutch member 4 engageable and disengageable drivingly with the member 5 of the present clutch construction is shown to illustrate a possible arrangement, and it will be understood that these parts are in continual driving engagement during the operation of the clutch of my invention. Obviously, other arrangements and applications of the clutch will occur to those skilled in the art, either in association with a pump as I have indicated or with other driven instrumentalities.

Referring to Fig. 2, the reference numeral 6 indicates a driving shaft for my clutch construction connected to the driven clutch element 5, while the reference numeral 7 designates a driven or output shaft of the clutch which is operatively connected as by direct driving connections to the pump impeller or other driven instrumentality. These shafts as well as the other details of construction of the clutch are enclosed in a suitable two-part casing 8.

The driving shaft 6 at the left hand end thereof, as viewed in Fig. 2, is drivingly connected to a sleeve-like jaw-carrying male clutch member 9 by means of a spline or key 10, which sleeve member, and accordingly the shaft 6, is rotatably mounted in an axially slidable clutch carrier 11 by means of a ball bearing 12, the inner race of which is secured to the sleeve by a threaded ring 13 on the extreme left hand end of the sleeve. Shaft 6 is also ball bearing supported at its other end as will be described hereinafter. Carrier 11 slides axially in a cylindrical bore 14 in the casing 8 and is provided with a cam follower or stirrup 15 which is engaged by an actuating lug 16 eccentrically mounted on a rotatably adjustable control member 17. This member 17 is provided with an actuating or control handle 18, see Fig. 1, whereby it is rotatably adjusted to actuate the clutch carrier 11 in an axial direction so as to control the clutch engagement and disengagement in the manner to be described. The clutch sleeve 9 has slidably mounted thereon a conical friction clutch member 19 including the integral annular inner flange 20, which encircles the sleeve, and the conical male friction clutch face 21 adapted to coact with an annular conical female friction clutch face 22 on an axially restrained friction clutch member 23 to be further described. Relative rotation of the friction clutch member 19 and the sleeve 9 is prevented by the coacting meshing external and internal teeth 24, 25 respectively on the sleeve 9 and clutch member 19. These teeth permit relative axial sliding of the male friction clutch member and sleeve in the manner described.

With the parts in the inoperative position illustrated in Fig. 4, the male friction clutch member 19 is ordinarily urged to the right relative to the sleeve, in which position the annular flange 20 restrainingly engages the side of the toothed portion 24 of the sleeve, by means of a coil compression spring 26 encircling the sleeve and abutting the aforesaid annular flange 20 at one end and the ball bearing 12 at its other. Thus, it will be appreciated that upon initial axial movement of the clutch carrier 11 to the right, as illustrated in Fig. 4, the male and female friction clutch faces 21, 22 will be brought into engagement and upon further movement of carrier 11 in the same direction will be maintained in said engagement by the tension of spring 26, which is compressed while sleeve 9 continues to shift to the right relative to clutch member 19 for engagement of the positive jaw clutch means as will be described. This initial friction clutch engagement of the members 19 and 23 causes the latter to be brought into rotative synchronism with the former.

Sleeve 9 is provided with an externally toothed male jaw clutch member 27 on its extreme right hand end as viewed in the drawings, which is employed in effecting the positive driving connection referred to above. Clutch member 27 is engageable upon continued shifting of sleeve 11 to the right with an alining ring 28 specifically illustrated in Fig. 3. This ring has a toothed female jaw 29 which makes positive driving engagement with the externally toothed male jaw 27 and is provided with a pair of oppositely directed driving lugs 30 receivable in opposed recesses 31 provided in the axially extending annular flange 32 of a sleeve-like driven clutch member 33. This last named driven clutch member is provided with a bushing 34 rotatably mounting the same on driving shaft 6 and is rotatably mounted on the housing or casing 8 by means of a ball bearing 35 restrained axially by a ring 36 threaded on the clutch member. The female friction clutch member 23 is drivingly connected in a suitable manner to driven clutch member 33 and a gear 37 is keyed on driven clutch member 33, so that driving rotation of the female friction clutch member is positively transmitted therefrom to the gear.

Again referring to Fig. 3, taken in connection with Fig. 2, it will be seen that a lost motion driving engagement is made possible by engagement of the driving lugs 30 on alining ring 28 with either side of the slots or recesses 31 in the driven clutch member 33. These slots are of sufficient angular extent to permit relative rotation of the ring and clutch member equivalent to the angular distance between two of the teeth on the male and female clutch jaws 27, 29. In order to maintain the driving lugs 30 in intermediate position when not operating, a portion of the ring is cut away at 38 to provide an annular peripheral groove and the clutch member flange is likewise relieved or recessed at 39 to provide an arcuate segmental opening wherein a coil compression spring 40 is disposed, being maintained in place by a cover plate 41 screwed on the clutch member flange. It will be evident that the ends of this spring abut equally against the ring and flange whereby to resist relative movement thereof from a position from which the driving lugs 30 are disposed centrally in their respective driven member recesses 31. However, the spring 40 will yield in either direction to enable the clutch 27 to engage the internal clutch teeth of the alining ring, the coacting clutch teeth at this point being preferably beveled or cambered as indicated by the reference numeral 42 in Fig. 4 to further facilitate a quick meshing of the clutch members without clash or damage. Once in proper driving mesh, force is transmitted from the jaw connection through driving lugs 30 to clutch member 33 to positively rotate the latter and gear 37. This last named gear is in constant mesh with a pinion 44 keyed to the driven shaft 7 which is rotatably mounted in the housing by ball bearings 43.

In operation, with the parts originally in the position illustrated in Fig. 5, i. e., with the male and female friction clutch members 19, 23 separated and male member 19 urged fully to the right relative to sleeve 9, if it is desired to drive output shaft 7 and the instrumentality associated therewith from the high speed prime mover, all that is necessary is to give the control handle 18 a continuous 180° movement, causing eccentric lug 16 to move from the initial position illustrated in Fig. 5 to the final position of Fig. 2. During this movement, the eccentric first travels to the intermediate position of Fig. 4, during which the carrier 11 is shifted in its casing bore 14 to advance the male friction clutch member 19 into operative clutching engagement with the female friction clutch member 23, the coil spring 26 acting as a resilient thrust transmitting element. Further movement of the eccentric 16 to the final position of Fig. 2 causes the coil spring 26 to be compressed as illustrated in the last named figure, with resultant shifting of the sleeve 9 and clutch jaw 27 thereon relative to the male friction clutch member and into meshing engagement with the internal jaw 29 of the alining ring 28. This engagement is effected without clash or undue stress on the parts due to the limitedly yieldable lost motion driving connection between alining ring 28 and the driven clutch member 33 provided by the arrangement of driving lugs 30 in the relatively elongated clutch member recesses 31. With the parts in the position described, a positive driving connection is effected between sleeve 9 and driven clutch member 33 to actuate gear 37 and the driven shaft 7.

The automatic self-alining mechanism is of primary importance in the present construction, for without the same the driving jaws of the male and female clutch members could not aline themselves so as to permit sliding engagement. The only way to insure mesh would be to apply sufficient pressure to the control handle 18 to overcome the friction between friction clutch faces imparted by coil spring 26, which is considerable, and this would be attended by clashing and diminution of the speed of operation. With the present structure, a single uninterrupted control movement of handle 18 suffices in all cases.

In order to declutch, the handle is shifted in the opposite direction, which moves the clutch carrier sleeve 9 to the left to first disengage the positive driving jaws and finally the friction clutch faces in a manner that will be apparent.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. In a clutch of the type described, a housing having driving and driven shafts rotatably mounted therein, a driving sleeve having a toothed clutch jaw thereon, said sleeve being non-rotatably mounted on said driving shaft for movement axially thereof, thrust means engageable with the sleeve to shift the same axially, a friction clutch member non-rotatably mounted on said sleeve for axial movement thereon, resilient means engaging said thrust means and said friction clutch member for moving the member with the sleeve through a predetermined distance, said last named means being yieldable thereafter to permit further axial movement of the sleeve relative to the member, an axially restrained friction clutch member engageable by said first named friction clutch member and rotatable relative to said driving shaft, a driven sleeve concentric with said driving shaft non-rotatably connected to said last named friction clutch member, an alining ring concentric with the driving shaft and provided with a toothed clutch jaw drivingly engageable by said first named jaw following axial movement of said sleeve, said ring having radially extending driving lugs thereon and said driven sleeve having recesses receiving said lugs with lateral clearance equivalent to approximately two teeth of the jaws to effect a lost motion driving connection between the ring and driven sleeve and enable ready axial meshing engagement of the clutch jaws, means coacting with said ring and driven sleeve for yieldably maintaining said lugs in predetermined angular relation to said recesses when the jaws are not engaged, and means connected to said driven sleeve for driving said driven shaft therefrom, said friction clutch members being engageable prior to said clutch jaws upon axial movement of the driving sleeve.

2. In a clutch of the type described, a housing having driving and driven shafts rotatably mounted therein, a driving sleeve having a toothed clutch jaw thereon, said sleeve being non-rotatably mounted on said driving shaft for movement axially thereof, thrust means engageable with the sleeve to shift the same axially, a friction clutch member non-rotatably mounted on said sleeve, resilient means engaging said thrust means and said friction clutch member for moving the member with the sleeve through a predetermined distance, a friction clutch member engageable by said first named friction clutch member and rotatable relative to said driving shaft, a driven sleeve concentric with said driving shaft non-rotatably connected to said last named friction clutch member, an alining ring concentric with the driving shaft and provided with a toothed clutch jaw drivingly engageable by said first named jaw following axial movement of said sleeve, said ring having radially extending driving lugs thereon and said driven sleeve having recesses receiving said lugs with lateral clearance to effect a lost motion driving connection between the ring and driven sleeve and enable ready axial meshing engagement of the clutch jaws, means coacting with said ring and driven sleeve for yieldably maintaining said lugs in predetermined angular relation to said recesses when the jaws are not engaged, and means connected to said driven sleeve for driving said driven shaft therefrom, said friction clutch members being engageable prior to said clutch jaws upon axial movement of the driving sleeve.

3. In a high speed clutch of the type described, driving and driven shafts, friction and jaw clutch devices disposed concentric of said driving shaft and successively engageable in the operation of the clutch, said jaw clutch device comprising a sleeve driven by and slidable axially on said driving shaft, a driven clutch member rotatable relative to the driving shaft, a clutch ring concentric with said driven member and having driving lugs extending radially therefrom, said ring and sleeve having toothed jaws drivingly engageable upon relative axial movement thereof, said driven member having recesses receiving said lugs for limited relative angular movement of the driven member and ring following which the driven member and ring are drivingly connected through said lugs, means interposed between the driven member and ring for resiliently opposing relative angular movement thereof and yielding to permit angular meshing engagement of the jaws, and means drivingly connecting said driven member and driven shaft to actuate the latter.

4. In a high speed clutch of the type described, driving and driven shafts, friction and jaw clutch devices successively engageable in the operation of the clutch, said jaw clutch device comprising a sleeve driven by and slidable axially relative to said driving shaft, a driven clutch member rotatable relative to the driving shaft, a clutch ring concentric with said driven member and having driving lugs extending radially therefrom, said ring and sleeve having toothed jaws drivingly engageable upon relative axial movement thereof, said driven member having recesses receiving said lugs for limited relative angular movement of the driven member and ring following which the driven member and ring are drivingly connected through said lugs, means interposed between the driven member and ring for resiliently opposing relative angular movement thereof and yielding to permit angular meshing engagement of the jaws, and means drivingly connecting said driven member and driven shaft to actuate the latter.

5. In a high speed clutch of the type described, driving and driven shafts, friction and jaw clutch devices successively engageable in the operation of the clutch, said jaw clutch device comprising a sleeve driven by and slidable axially relative to said driving shaft, a driven clutch member rotatable relative to the driving shaft, a clutch ring member and said sleeve having toothed jaws drivingly engageable upon relative axial movement thereof, said driven and ring members having lost motion angular drive means connecting the same permitting limited relative angular movement thereof following which the driven member and ring member are drivingly connected, means interposed between the members for resiliently opposing relative angular movement thereof and yielding to permit angular meshing engagement of the jaws, and means drivingly connecting said driven member and driven shaft to actuate the latter.

6. In a high speed clutch of the type described, driving and driven shafts, friction and jaw clutch devices successively engageable in the operation of the clutch, said jaw clutch device comprising a sleeve slidable axially relative to said driving shaft, a driven clutch member, a clutch ring member concentric with said driven member, said ring member and sleeve having toothed jaws drivingly engageable upon relative axial movement thereof, said driven and ring members having lost motion angular drive means connecting the same permitting limited relative angular movement thereof following which the driven member and ring member are drivingly connected, means interposed between the members for resiliently opposing relative angular movement thereof and yielding to permit angular meshing engagement of the jaws, and means drivingly connecting said driven member and driven shaft to actuate the latter.

7. In a clutch of the type described, driving and driven shafts, a driven clutch member rotatable on said driving shaft and having means operatively connected thereto for driving said driven shaft, a friction clutch element rotatable with said driven clutch member, a slidable driving clutch member mounted in angularly fixed relation on said driving shaft and having clutch teeth thereon, said driving and driven clutch members being mounted for axial movement relative to one another, a ring concentric with said driving shaft having clutch teeth drivingly engageable by said first named teeth upon relative axial approach of said driving and driven members, said driving clutch having a friction clutch element mounted in angularly fixed relation thereon for driving coaction with said first named element, spring means coacting with said driving clutch member for urging said friction elements into operative engagement upon initial relative movement of the driving and driven clutch members, said spring means yielding to permit relative axial movement of the driving member and friction element thereon upon further relative movement of the members, said ring member having driving lugs projecting radially thereon and said driven member having a flange provided with opposed recesses receiving the lugs of sufficient lateral width to permit substantial relative angular movement of the lugs in said recesses, and coil spring means disposed between and abutting said driven member and ring to normally resist relative angular movement thereof, said last named spring means yielding upon driving engagement of said clutch teeth to enable said lugs to drivingly engage said driven member flange.

8. In a clutch of the type described, driving and driven shafts, a driven clutch member on said driving shaft and having means operatively connected thereto for driving said driven shaft, a friction clutch element rotatable with said driven clutch member, a slidable driving clutch member mounted in angularly fixed relation on said driving shaft and having clutch teeth thereon, said driving and driven clutch members being mounted for axial movement relative to one another, a ring concentric with said driving shaft having clutch teeth drivingly engageable by said first named teeth upon relative axial approach of said driving and driven members, said driving clutch having a friction clutch element mounted in angularly fixed relation thereon for driving coaction with said first named element, spring means coacting with said driving clutch member for urging said friction elements into operative engagement upon initial relative movement of the driving and driven clutch members, said spring means yielding to permit relative axial movement of the driving member and friction element thereon upon further relative movement of the members, said driven and ring members having coacting lugs and recesses receiving the lugs of sufficient lateral width to permit substantial relative angular movement of the lugs in said recesses, and spring means coacting with said driven member and ring to normally resist relative angular movement thereof, said last named spring means yielding upon driving engagement of said clutch teeth to enable said lugs to drivingly engage said driven member.

9. In a high speed clutch of the type described, driving and driven shafts, driving and driven clutch members mounted on said driving shaft for relative movement axially thereof, one of said members being rotatably secured to the shaft, driving and driven friction clutch elements disposed for axial movement relative to said driving shaft and one another for operative engagement upon relative axial movement of said members, a ring disposed concentric of the driven clutch member, said ring having opposed radially extending driving lugs and said driven member having recesses receiving said lugs with substantial lateral clearance whereby to provide a lost motion driving connection between the ring and driven member, said driving clutch member and ring having coacting toothed jaws drivingly engageable upon relative axial movement of the members, spring means interposed between said ring and driven member normally opposing relative angular movement thereof and yielding to permit such angular movement sufficient to insure meshing engagement of the jaws, and means drivingly connected with said driven member for rotating the driven shaft.

10. In a high speed clutch of the type described, driving and driven shafts, driving and driven clutch members mounted on said driving shaft for relative movement axially thereof, one of said members being rotatably secured to the shaft, driving and driven friction clutch elements disposed for axial movement relative to said driving shaft and one another for operative engagement upon relative axial movement of said members, a ring disposed concentric of the driven clutch member, said ring having opposed radially extending driving lugs and said driven member having recesses receiving said lugs with substantial lateral clearance whereby to provide a lost motion driving connection between the ring and driven member, said driving clutch member and ring having coacting toothed jaws drivingly engageable upon relative axial movement of the members, spring means normally opposing relative angular movement of the ring and driven member and yielding to permit such angular movement sufficient to insure meshing engagement of the jaws, and means drivingly connected with said driven member for rotating the driven shaft.

11. In a high speed clutch of the type described, driving and driven shafts, driving and driven clutch members mounted on said driving shaft for relative movement axially thereof, one of said members being rotatably secured to the shaft, driving and driven friction clutch elements disposed for axial movement relative to said driving shaft and one another for operative engagement upon relative axial movement of said members, a ring member disposed concentric of the driven clutch member, said driven and ring members having coacting driving lugs and recesses, said recesses receiving said lugs with substantial lateral clearance whereby to provide a lost motion driving connection between the ring and driven members, said driving clutch member and ring member having coacting toothed jaws drivingly engageable upon relative axial movement of the members, spring means normally opposing relative angular movement of said ring and driven members and yielding to permit such angular movement sufficient to insure meshing engagement of the jaws, and means drivingly connected with said driven member for rotating the driven shaft.

ADRIAN P. ADNEY.